United States Patent
Cunningham et al.

(10) Patent No.: US 10,161,284 B2
(45) Date of Patent: Dec. 25, 2018

(54) ON-BOARD DIAGNOSTIC METHODS FOR PARTIAL FILTRATION FILTERS

(71) Applicant: Cummins Emission Solutions, Inc., Columbus, IN (US)

(72) Inventors: Michael J. Cunningham, Greenwood, IN (US); Phanindra V. Garimella, Bloomington, IN (US); Venkata R. Lakkireddy, Columbus, IN (US); Ming-Feng Hsieh, Nashville, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 270 days.

(21) Appl. No.: 14/854,414

(22) Filed: Sep. 15, 2015

(65) Prior Publication Data
US 2016/0084137 A1    Mar. 24, 2016

Related U.S. Application Data (60) Provisional application No. 62/054,820, filed on Sep. 24, 2014.

(51) Int. Cl.
*F01N 3/00* (2006.01)
*F01N 11/00* (2006.01)
(Continued)

(52) U.S. Cl.
CPC ............ *F01N 11/002* (2013.01); *F01N 3/021* (2013.01); *F01N 3/103* (2013.01);
(Continued)

(58) Field of Classification Search
CPC ............... F01N 11/002; F01N 13/0093; F01N 13/0097; F01N 3/021; F01N 3/103;
(Continued)

(56) References Cited

U.S. PATENT DOCUMENTS

| 2011/0143449 A1* | 6/2011 | Lana | F01N 11/002 |
| | | | 436/147 |
| 2014/0046576 A1* | 2/2014 | Chamarthi | F02D 41/045 |
| | | | 701/108 |

FOREIGN PATENT DOCUMENTS

| CN | 103573443 A | 2/2014 | |
| DE | 10 2005 008 638 A1 | 8/2006 | |
| DE | 102005008638 | * 8/2006 | ........... F01N 13/009 |

OTHER PUBLICATIONS

First Office Action issued for Chinese Patent Application No. 201505950503, dated Jan. 29, 2018, with English language translation, 11 pages.

* cited by examiner

*Primary Examiner* — Manish S Shah
*Assistant Examiner* — Timothy Graves
(74) *Attorney, Agent, or Firm* — Foley & Lardner LLP (57) ABSTRACT

A system for and method of diagnosing operation of a partial filtration filter exhaust aftertreatment system are provided. An upstream exhaust temperature value is determined in an exhaust system upstream of at least one of a diesel oxidation catalyst (DOC) component and a first partial flow filter (PFF) component. A downstream exhaust temperature value is determined in the exhaust system downstream of a second PFF component positioned downstream of the at least one of the DOC component and the first PFF component. A frequency difference is determined between a first frequency content of the upstream exhaust temperature value and a second frequency content of the downstream exhaust temperature value. If the frequency is less than a predetermined threshold, it is determined that at least one of the DOC component and the PFF component are not present in the exhaust system.

10 Claims, 7 Drawing Sheets

(51) Int. Cl.
  *G01M 15/10* (2006.01)
  *G01K 3/00* (2006.01)
  *G01K 13/02* (2006.01)
  *F01N 3/10* (2006.01)
  *F01N 3/021* (2006.01)
  *F01N 13/00* (2010.01)

(52) U.S. Cl.
  CPC ..... *F01N 13/0093* (2014.06); *F01N 13/0097* (2014.06); *G01K 3/00* (2013.01); *G01K 13/02* (2013.01); *G01M 15/106* (2013.01); *F01N 2550/02* (2013.01); *F01N 2550/04* (2013.01); *F01N 2550/24* (2013.01); *F01N 2560/06* (2013.01); *F01N 2900/0416* (2013.01); *G01K 2013/024* (2013.01); *G01K 2205/04* (2013.01); *Y02T 10/20* (2013.01); *Y02T 10/47* (2013.01)

(58) Field of Classification Search
  CPC ............ F01N 2550/02; F01N 2550/04; F01N 2550/24; F01N 2560/06; F01N 2900/0416; G01K 3/00; G01K 13/02; G01K 2013/024; G01K 2205/04; G01M 15/106; Y02T 10/20; Y02T 10/47
  See application file for complete search history.

ON-BOARD DIAGNOSTIC METHODS FOR PARTIAL FILTRATION FILTERS

CROSS REFERENCE TO RELATED APPLICATIONS

This application claims priority to U.S. Provisional Patent Application No. 62/054,820 filed Sep. 24, 2014 and entitled "On-board Diagnostic Methods for Partial Filtration Filters," the entire disclosure of which is incorporated herein by reference.

TECHNICAL FIELD

This disclosure relates to exhaust aftertreatment systems for internal combustion engines.

BACKGROUND

Increasingly stringent emissions standards require vehicles powered by internal combustion engines, such as diesel engines, to be equipped with treatment systems to prevent and reduce harmful emissions being released to the atmosphere as by-products of combustion processes in systems such as diesel engines. Such treatment systems may include a variety of components, each of which is susceptible to failure. The failure or absence of one or more components of an exhaust treatment system may enable release of undesirable exhaust emissions and may waste or damage other related components of the treatment system. Accordingly, on board diagnostic (OBD) systems may be used to detect the operation and presence of components of the exhaust treatment system.

Existing OBD methods use a delta pressure sensor to diagnose the operation and potential failure of individual aftertreatment components. However, delta pressure sensors increase the complexity and costs of the exhaust system and diagnostic components.

SUMMARY

Various embodiments provide a partial filtration filter diagnostic system for an exhaust system and methods of diagnosing the operation of a partial filtration filter in an exhaust aftertreatment system.

In a first set of embodiments, a partial filtration filter diagnostic system for an exhaust system comprises an upstream exhaust temperature module configured to determine an upstream exhaust temperature value in an exhaust system upstream of at least one of a diesel oxidation catalyst (DOC) component and a partial flow filter (PFF) component. The PFF component is downstream of the DOC component. A downstream exhaust temperature module is configured to determine a downstream exhaust temperature value in the exhaust system downstream of the PFF component. A frequency analysis module is configured to determine a frequency difference in a first frequency content of the upstream exhaust temperature value and second frequency content of the downstream exhaust temperature value.

In particular embodiments, the frequency analysis module is further configured to determine that at least one of the DOC component and the PFF component is not present in the exhaust system if the frequency is less than a predetermined threshold. If it is determined that at least one of the DOC component and the PFF component is not present in the exhaust system, the frequency analysis module indicates to a user that the at least one of the DOC component and the PFF component is not present in the exhaust system.

In various embodiments, the PFF component is a first PFF component and the system includes a second PFF component downstream of the first PFF component. The downstream exhaust temperature module is configured to determine the downstream exhaust temperature value in the exhaust system downstream of the second PFF component. The frequency analysis module may be configured to determine the frequency difference via a Fast Fourier Transform analysis.

In another set of embodiments, a method of diagnosing operation of a partial filtration filter exhaust aftertreatment system includes receiving an upstream exhaust temperature value corresponding to fluid temperature upstream of at least one of a DOC component and a PFF component. The PFF component is downstream of the DOC component. A downstream exhaust temperature value is also received that corresponds to fluid temperature downstream of the PFF component. A frequency difference is then determined between a first frequency content of the upstream exhaust temperature value and a second frequency content of the downstream exhaust temperature value. If the frequency difference is less than a predetermined threshold, it is determined that at least one of the DOC component and the PFF component is not present in the exhaust system. If it is determined that at least one of the DOC component and the PFF component is not present in the exhaust system, it is indicated to a user that the at least one of the DOC component and the PFF component is not present in the exhaust system.

In particular embodiments, the determining of the frequency difference includes performing a Fast Fourier Transform of the upstream exhaust temperature value and downstream exhaust temperature value. The method includes comparing the difference in the first frequency content of the upstream exhaust temperature value and the second frequency content of the downstream exhaust temperature value in different frequency regimes, in accordance with particular embodiments. The upstream exhaust temperature value may be received from the at least one first sensor positioned downstream of the DOC component. At least one of the first PFF and the second PFF may include a catalyst coating including at least one of a DOC coating and a selective catalytic reduction catalyst coating.

In yet another set of embodiments, a method of diagnosing operation of a partial filtration filter includes receiving an upstream exhaust pressure value from at least one first sensor positioned upstream of a turbine connected to an exhaust system including at least one of a DOC component and, a PFF component. The turbine is positioned upstream of the at least one of the DOC component and the PFF component. A downstream exhaust temperature value is received from at least one second sensor positioned downstream of the turbine and upstream of the DOC component. An exhaust pressure is determined as a function of an exhaust volumetric flow rate based on the upstream exhaust pressure value and the downstream exhaust temperature value. It is also determined if the exhaust pressure is at least one of lower than a low pressure threshold at the exhaust volumetric flow rate and greater than a high pressure threshold at the exhaust volumetric flow rate. If the exhaust pressure is greater than the high pressure threshold, it is determined that the PFF component is plugged. If it is determined that the PFF component is plugged, it is indicated to a user that the PFF component is plugged. In particular embodiments, if the exhaust pressure is less than the low pressure threshold, it is determined that the PFF component is not present in the exhaust system. If it is determined that the PFF component is not present in the exhaust system, it is indicated to a user that the PFF component is not present in the exhaust system.

In still another set of embodiments, a method of diagnosing operation of a partial filtration filter comprises receiving a downstream exhaust pressure value corresponding to fluid pressure downstream of a turbine connected to an exhaust system including a DOC component and a PFF component positioned downstream of the DOC component. The turbine is positioned upstream of the DOC component. A downstream exhaust temperature value is received which corresponds to a fluid temperature downstream of the turbine and upstream of the DOC component. An exhaust pressure is determined as a function of an exhaust volumetric flow rate based on the downstream exhaust pressure value and the downstream exhaust temperature value. It is determined if the exhaust pressure is at least one of lower than a low pressure threshold at the exhaust volumetric flow rate and greater than a high pressure threshold at the exhaust volumetric flow rate. If the exhaust pressure is greater than the high pressure threshold, it is determined that the PFF component is plugged. If it is determined that the PFF component is plugged, it is indicated to a user that the PFF component is plugged.

In another set of embodiments, an internal combustion engine system includes an internal combustion engine including an exhaust manifold. An exhaust aftertreatment system is coupled to the exhaust manifold. The exhaust aftertreatment system includes a diesel oxidation catalyst (DOC) component and a partial flow filter (PFF) component positioned downstream of the DOC component, at least one first sensor positioned upstream of at least one of the DOC component and the PFF component, and at least one second sensor positioned downstream of the PFF component. The at least one first sensor is configured to detect an upstream exhaust temperature value. The at least one second sensor is configured to detect a downstream exhaust temperature value. The internal combustion engine system also includes a controller communicatively coupled to the at least one first sensor and the at least one second sensor. The controller is configured to determine a frequency difference in a first frequency content of the upstream exhaust temperature value and second frequency content of the downstream exhaust temperature value.

In particular embodiments, a partial filtration filter diagnostic system for an exhaust system is provided. The system includes an upstream exhaust temperature module configured to determine an upstream exhaust temperature value in an exhaust system upstream of a first partial flow filter (PFF) component and a downstream exhaust temperature module configured to determine a downstream exhaust temperature value in the exhaust system downstream of a second PFF component. The second PFF component is downstream of the first PFF component. The system also includes a frequency analysis module configured to determine a frequency difference in a first frequency content of the upstream exhaust temperature value and second frequency content of the downstream exhaust temperature value.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive partial filtration filter diagnostic systems for an exhaust system and methods of diagnosing operation of a partial filtration filter exhaust aftertreatment system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

The present disclosure provides multiple unique configurations and methods for OBD systems on an exhaust system including partial flow particulate filters. Partial flow filters (PFF) may also be referred to as flow through filters, open particulate filters, or partial filter technology (PFT). The diagnostic embodiments described herein are generally used to diagnose two failure methods for these partial flow filters. One particular failure mode includes detecting the lack of presence of a PFF in the exhaust system. Another particular failure mode includes detection of a malfunction of the PFF that leads to an excessive exhaust pressure at the turbine outlet location, such that this pressure exceeds a recommended threshold for maximum backpressure, for example a maximum back pressure specified by the manufacturer of the engine.

Particular embodiments disclosed herein use the frequency content within two temperature measurements to detect filter presence, as described further herein. Other embodiments use an exhaust pressure measurement and exhaust volumetric flow rate to determine presence and excessive backpressure, as described further herein. Still further embodiments can use the detection of changes in the EGR system to detect excessive backpressure.

Embodiments disclosed herein are generally directed to exhaust systems including either one or two partial flow filters (PFF) in series either by it/themselves or behind a diesel oxidation catalyst (DOC). The filters can be uncoated, or may include a washcoat for example a diesel oxidation catalyst (DOC) coating or a selective catalytic reduction (SCR) catalyst for example.

Figure 1:
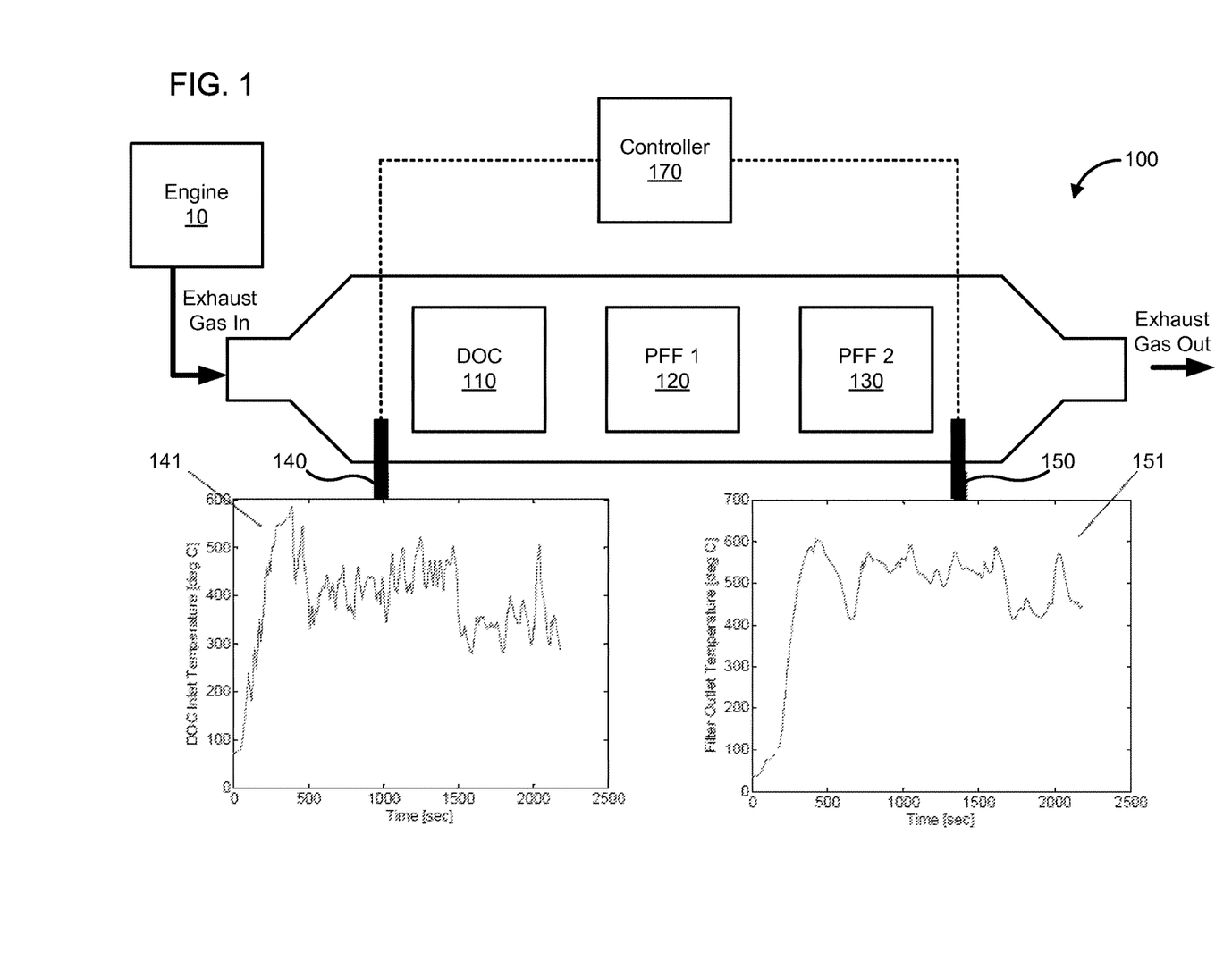
FIG. 1 is a schematic of an exhaust system including components of a partial filtration filter diagnostic system with a temperature sensor positioned upstream of a diesel oxidation catalyst component, in accordance with a first set of example embodiments.

FIG. 1 is a schematic of an exhaust system including components of a partial filtration filter diagnostic system with a temperature sensor positioned upstream of a diesel oxidation catalyst component, in accordance with a first set of example embodiments. An exhaust system 100 includes a DOC component 110, a first PFF 120, a second PFF 130 and a controller 170. The exhaust system 100 includes an upstream temperature sensor 140 upstream of the DOC component 110 and a downstream temperature sensor 150 downstream of the second PFF 130.

The exhaust system 100 is configured to receive an exhaust gas and filter the exhaust gas (e.g., filter particulate matter such as carbon, soot dust, etc. in the exhaust gas). In various embodiments, the exhaust system 100 can be included in an internal combustion engine system which includes an engine 10 as shown in FIG. 1. The engine 10 can include an exhaust manifold (not shown) fluidly coupled to exhaust system 100. In various embodiments, the engine 10 includes a diesel engine, a gasoline engine, a natural gas engine, a biofuel (e.g., ethanol or biodiesel) engine, a dual-fuel engine (e.g., natural gas and diesel engine) or any other suitable internal combustion engine.

The upstream temperature at the DOC inlet location, detected by the upstream temperature sensor 140, has high frequency fluctuations in temperature values, as shown on a sample upstream temperature data chart 141 of the upstream temperature sensor 140. The frequency fluctuations in the temperature values detected by the upstream temperature sensor 140 may be compared to the frequency fluctuations in temperature values detected by the downstream temperature sensor 150, as demonstrated, for example, on a sample downstream temperature data chart 151. In various embodiments, each of the upstream temperature sensor 140 and downstream temperature sensor 150 include a thermocouple, a thermistor or a resistance temperature detector (RTD) sensor. In other embodiments, a plurality of upstream temperature sensors and downstream temperature sensors can be included in the exhaust system 100 and used to perform the sensing and diagnostic functions described herein.

The ceramic aftertreatment elements, namely the DOC component 110, the first PFF 120, and the second PFF 130, are large thermal masses that dampen out the higher frequency content within the temperature signal. Through signal processing of the raw temperature measurements from the upstream temperature sensor 140 and the downstream temperature sensor 150, a difference in frequency may be determined, which difference in frequency indicates a presence of a series of aftertreatment elements. If the aftertreatment elements have been removed, the difference in the frequency content of the upstream temperature signal and the downstream temperature signal will not be present.

The controller 170 is communicatively coupled to the upstream temperature sensor 140 and the downstream temperature sensor 150. The upstream temperature sensor 140 is configured to detect an upstream temperature value and the downstream temperature sensor 150 is configured to detect a downstream temperature value. The controller 170 is configured to interpret each of the upstream temperature value and the downstream temperature value and determine a frequency difference in a first frequency content of the upstream temperature value and a second frequency content of the downstream temperature value. If the frequency difference is less than a predetermined threshold, the controller 170 determines that at least one of the DOC component 110, the first PFF component 120 and/or the second PFF component 130 is not present in the exhaust system 100. The controller 170 can indicate to a user that at least one of the DOC component 110, the first PFF component 120 and/or the second PFF component 130 is not present in the exhaust system 100, for example by lighting a malfunction indicator lamp (MIL) or generate a fault code stored in a memory of the controller 170, as described herein.

Expanding further, as described before each of the DOC component 110, the first PFF component 120 and the second PFF component 130 serve as frequency dampers which damp the higher frequencies within the temperature signal from the upstream temperature value to the downstream temperature value. Each of the DOC component 110, the first PFF component 120 and the second PFF component 130 can have a particular damping signature. If all of the DOC component 110, the first PFF component and the second PFF component 130 are present in the exhaust system the frequency difference will be above the predetermined threshold.

However, if at least one of the DOC component 110, the first PFF component 120 and/or the second PFF component 130 is not present in the exhaust system 100 the frequency difference will be below the predetermined threshold indicating that at least one of the DOC component 110, the first PFF component 120 and/or the second PFF component 130 is not present in the exhaust system 100. In other embodiments, the controller 170 can also be configured to analyze amplitude, phase or any other characteristic of the frequency difference to determine which of the DOC component 110, the first PFF component 120 and/or the second PFF component 130 is not present in the exhaust system 100. In particular embodiments, if the frequency difference is zero (i.e., no damping), the controller 170 determines that neither one of the DOC component 110, the first PFF component 120 and/or the second PFF component 130 are present in the exhaust system 100 which is indicated to the user.

In accordance with particular embodiments, the frequency difference is determined via a Fast Fourier Transform analysis of both signals and comparing the differences in different frequency regimes. This analysis may be computed via micro-processors communicably coupled to the upstream temperature sensor 140 and the downstream temperature sensor 150. The microprocessor may include library functions permitting the complex calculations to be achieved in real-time. In example embodiments, a bandpass filter or a high pass filter is used to process each signal in real-time and to compare the frequency content of the upstream temperature signal and the downstream temperature signal.

Figure 4:
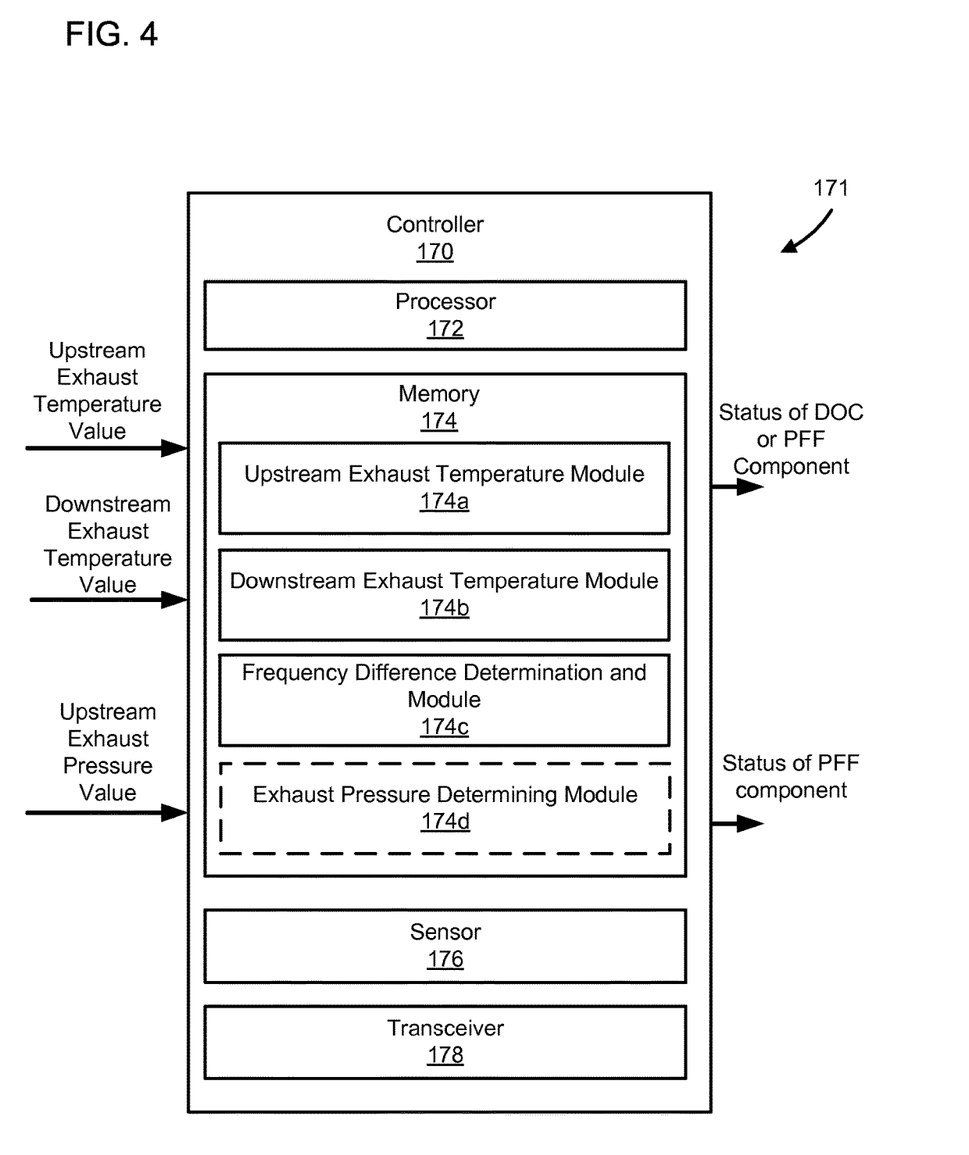
FIG. 4 is a schematic block diagram of a control module which includes a controller included in the exhaust systems of any one of FIGS. 1-3.

Referring also now to FIG. 4, in some embodiments, the controller 170 can be included in a control module 171. As shown in FIG. 4, the controller 170 includes a processor 172, a memory 174, a sensor 176 and a transceiver 178. It should be understood that the controller 170 shows only one embodiment of the controller 170 and any other controller capable of performing the operations described herein can be used (e.g., the computing device 630).

The controller 170 is configured to interpret the upstream temperature value or upstream exhaust temperature value of the upstream temperature sensor 140 as well as the downstream temperature value or the downstream exhaust temperature value of the downstream temperature sensor 150. For example, the sensor 176 can include an electrical sensor configured to receive and interpret the upstream temperature value and the downstream temperature value via hardwired communication circuitry or other wireless communication. In some embodiments, the sensor 276 can sense a current and/or a voltage generated by the upstream temperature sensor 140 and the downstream temperature value. In still other embodiments, the sensor 176 can also sense an exhaust pressure value of an exhaust pressure sensor (e.g., the exhaust pressure sensor 340 included in the exhaust system 300 of FIG. 3), s described below herein. The upstream temperature value includes the first frequency component and the downstream temperature value includes the second frequency component.

The processor 172 can include a microprocessor, programmable logic controller (PLC) chip, an ASIC chip, or any other suitable processor. The processor 172 is in communication with the memory 174 and configured to execute instructions, algorithms, commands or otherwise programs stored in the memory 174.

The Memory 174 can includes any of the memory and/or storage components discussed herein. For example, memory 174 may include RAM and/or cache of processor 172. Memory 174 may also include one or more storage devices (e.g., hard drives, flash drives, computer readable media, etc.) either local or remote to controller 170. The memory 174 is configured to store look up tables, algorithms or instructions. For example, the memory 174 includes an upstream exhaust temperature module 174a configured to store instructions for interpreting the upstream temperature value and determine the first frequency content therefrom. The memory also includes a downstream exhaust temperature module 174b configured to store instructions for interpreting the downstream temperature value and determine the second frequency content therefrom.

Moreover, the memory 174 also includes a frequency difference determination module 174c. The frequency difference determination module 174c includes when executed by the processor are configured to determine the frequency difference from the first frequency content and the second frequency content. The frequency difference is compared with a predetermined threshold or a predetermined frequency threshold. If the frequency difference is lower than the predetermined frequency threshold, the frequency difference determination module 174c determines that at least one of the DOC component 110, the first PFF component 120 and the second PFF component 130 is not present in the exhaust system 110. In particular embodiments, the frequency difference determination module 174c is also configured to analyze the frequency difference to determine which of the DOC component 110, the first PFF component 120 and/or the second PFF component 130 is not present in the exhaust system 100 as described before. If the frequency difference is zero, then the frequency difference determination module 174c determines that none of the DOC component 110, the first PFF component 120 and/or the second PFF component 130 are present in the exhaust system 100.

If at least one of the DOC component 110, the first PFF component 120 and/or the second PFF component 130 is not present in the exhaust system 100, the controller 170 indicates to the user that the DOC component 110, the first PFF component 120 and/or the second PFF component 130 is not present in the exhaust system 100. For example, the transceiver 178 included in the controller 170 is configured to generate a signal indicating the status of the DOC component 110, the first PFF component 120 and/or the second PFF component 130. For example, if at least one of the DOC component 110, the first PFF component 120 and the second PFF component 130 are not present in the exhaust system 100, the transceiver communicates a signal (e.g., a voltage, a current or any other electrical signal) which lights an MIL, thereby indicating to the user the status of the DOC component 110, the first PFF component 120 and/or the second PFF component 130.

Figure 2:
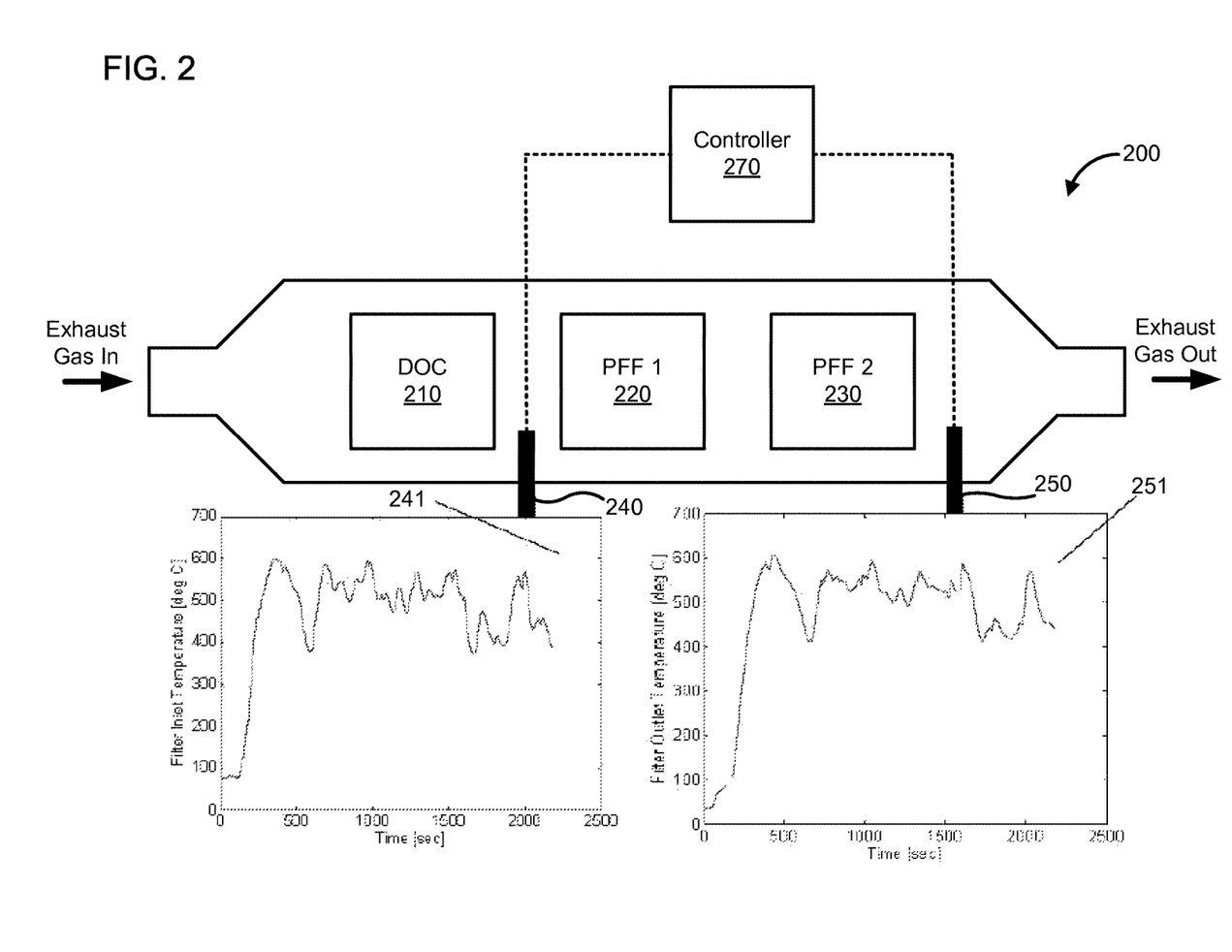
FIG. 2 is a schematic of an exhaust system including components of a partial filtration filter diagnostic system with a temperature sensor positioned downstream of a diesel oxidation catalyst component, in accordance with a second set of example embodiments.

In another embodiment, the upstream temperature sensor 140 can be positioned downstream of the DOC component 110 but upstream of the first PFF component 120 so that the frequency difference between the first frequency component and the second frequency component is only indicative of the presence of the first PFF component 120 or the second PFF component 130 in the exhaust system 100. For example, FIG. 2 is a schematic of an exhaust system 200 including components of a partial filtration filter diagnostic system with a temperature sensor positioned downstream of a diesel oxidation catalyst component, in accordance with a second set example embodiments.

The exhaust system 200 includes a DOC component 210, a first PFF component 220, a second PFF component 230 and a controller 270. The exhaust system 200 is the same as the exhaust system 100, with the exception that an upstream temperature sensor 240 is moved from upstream of the DOC component to downstream of the DOC component 210. A downstream temperature sensor 250 is positioned downstream of the second PFF component 230 similar to the exhaust system 100 of FIG. 1. This configuration allows for direct detection of the presence of the PFFs only. Because the difference in the frequency content of the temperature signal will be across only the first PFF 220 and the second PFF 230, the difference will be reduced with respect to the difference across the DOC component 110, the first PFF 120 and the second PFF 130 of FIG. 1.

Furthermore, the controller 270, which is substantially similar to the controller 170, is configured to determine a frequency difference between a first frequency component of an upstream exhaust temperature value of the upstream temperature sensor 240, and a second frequency component of a downstream exhaust temperature value of the downstream temperature sensor 25, as described before. If the frequency difference is less than a predetermined threshold or a predetermined frequency threshold, then the controller 270 determines that the first PFF component 220 and/or the second PFF component 230 is not present in the exhaust system 200. If it is determined that at least one of the first PFF component 220 and the second PFF component 230 is not present in the exhaust system, then the controller 270 indicates to the user that at least one of the first PFF component 220 and the second PFF component 230 is not present in the exhaust system 200, for example by lighting a MIL or generating a fault code.

In various embodiments, if the frequency difference is zero, then the controller 270 determines that neither the first PFF component 220 nor the second PFF component 230 is present in the exhaust system 200. In this scenario, the controller 270 indicates to the user that the first PFF component 220 and the second PFF component 230 are not present in the exhaust system 20.

In example embodiments, the upstream temperature sensors 140 and 240, and downstream temperature sensors 150 and 250 can be either physical or virtual sensors. The downstream temperature estimation could be embodied in many different methods. In example embodiments, the information on the current operating condition including but not limited to, engine speed and fueling in addition to other signals of interest, such as $O_2$ and air-to-fuel ratio to help with development of regression equations for the temperature estimation or the development of models which utilize the combustion models to predict the temperature at turbine outlet.

Figure 3:
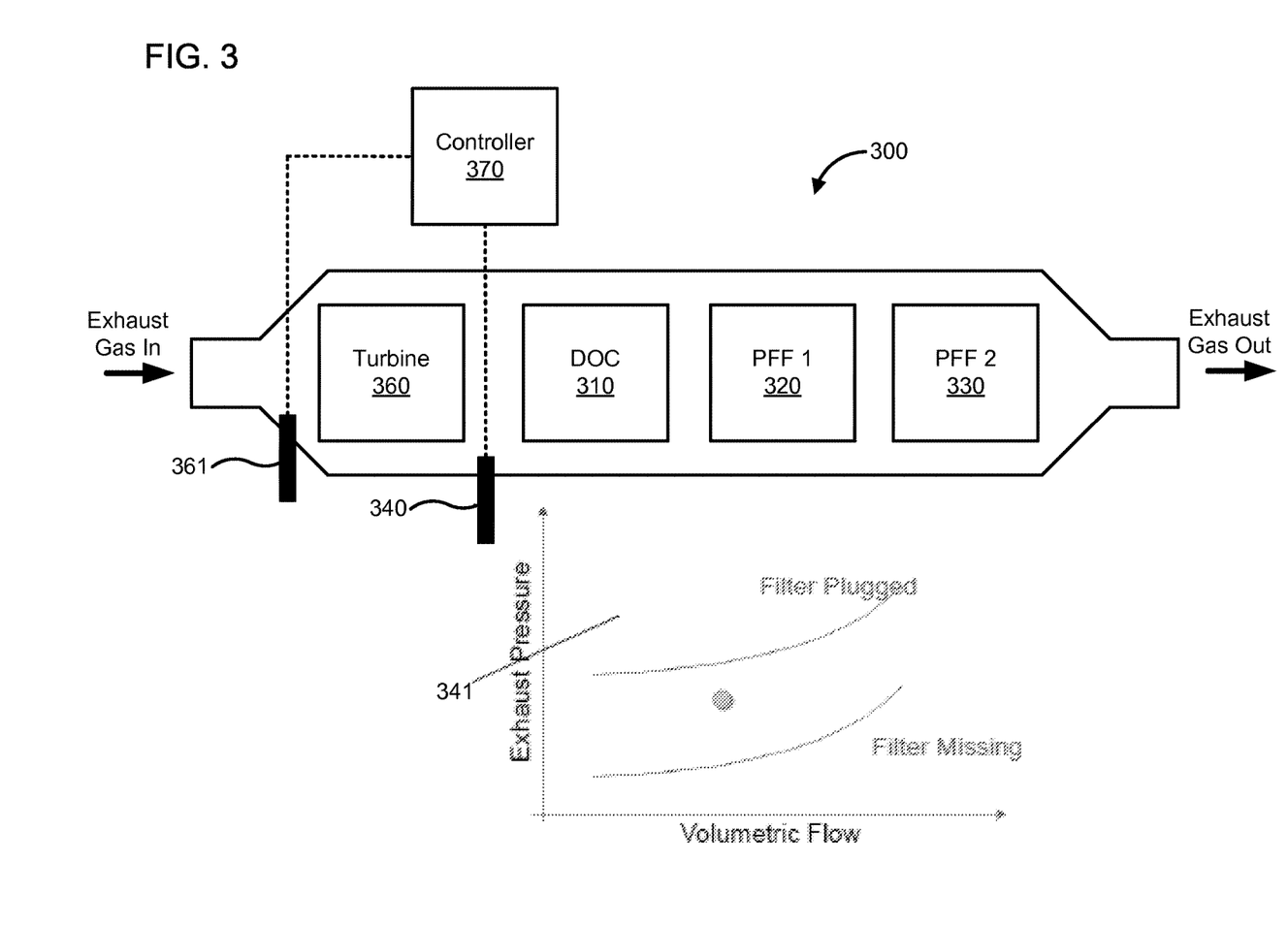
FIG. 3 is a schematic of an exhaust system including components of a volumetric flow based partial filtration filter diagnostic system including a physical or virtual temperature sensor positioned upstream of a diesel oxidation catalyst component, in accordance with a third set of example embodiments.

In other embodiments, an exhaust pressure and a downstream exhaust temperature value can be used to determine a status of one or more PFF components included in an exhaust system such as whether the PFF component is functioning correctly, is not present or is plugged. For example, FIG. 3 is a schematic of an exhaust system including components of a volumetric flow based partial filtration filter diagnostic system including a virtual temperature sensor positioned upstream of a diesel oxidation catalyst component, in accordance with a third set of example embodiments. An exhaust system 300 includes a DOC component 310, a first PFF component 320, a second PFF component 330, a turbine 360 and a controller 370. The DOC component 310 is positioned downstream of the turbine 360 and upstream of the first PFF component 320. The second PFF component 330 is positioned downstream of the first PFF component 320.

The exhaust system 300 includes an upstream temperature sensor 340 positioned upstream of the DOC component 310. This upstream temperature sensor 340 can be physical or virtual. The diagnostic system of exhaust system 300 uses an exhaust manifold pressure sensor 361 located upstream of the turbocharger, and a turbine outlet temperature measurement, obtained via the upstream temperature sensor 340 to determine the exhaust pressure as a function of exhaust volumetric flow rate. In various embodiments, the exhaust manifold pressure sensor 361 can also be positioned downstream of the turbine 360.

The controller 370 is communicatively coupled to the exhaust manifold pressure sensor 361 and the upstream temperature sensor 340. The controller 370 is configured to receive an exhaust pressure value, for example an upstream or a downstream exhaust pressure value based on the location of the exhaust pressure sensor 361. The controller 370 also receives a downstream exhaust temperature value from the upstream temperature sensor 340 corresponding to a fluid (i.e., exhaust gas) temperature downstream of the turbine 360 and upstream of the DOC component 310.

The controller 370 can be similar to the controller 170 shown in FIG. 4, with a few exceptions. The controller 170, when used as the controller 370 can also include an exhaust pressure determining module 174*d* configured to determine the exhaust pressure as a function of an exhaust volumetric flow rate based on the upstream exhaust pressure value and the downstream exhaust temperature value. The upstream exhaust temperature module 174*a* provides a downstream exhaust temperature value of the turbine 360 and upstream of the DOC component 310. In such embodiment, the downstream exhaust temperature module 174*b* can be excluded from the controller 170.

Exhaust pressure, as a function of exhaust volumetric flow rate, is then compared in the analysis to two threshold curves which includes a high pressure threshold curve and a low pressure threshold curve, for example stored pressure/volumetric flow rate information stored on data storage device, as shown on chart 341. For example, the exhaust pressure determining module 174*d* determines if the exhaust pressure is at least one of a lower than a low pressure threshold at the exhaust volumetric flow rate and greater than a high pressure threshold at an exhaust volumetric flow rate. If the exhaust pressure is within the high pressure threshold curve and the low pressure threshold curve, then the controller 370 determines that the PFF is functioning properly.

If the determined exhaust pressure as a function of exhaust volumetric flow rate, determined based on the measured pressure and the upstream temperature signal from the upstream temperature sensor 340, is below the low threshold curve, this indicates a missing filter. If the exhaust pressure as a function of the exhaust volumetric flow rate is above the high threshold curve, it indicates a plugged filter substrate. Information concerning such determinations may then, for example, be transmitted to an operator or service center so that proper maintenance can be performed.

For example, if it is determined that the first PFF component 320 and/or the second PFF component 330 is plugged, then the controller 370 indicates to a user that the first PFF component 320 and/or the second PFF component 330 is plugged, for example by lighting a MIL lamp or generating a fault code. Similarly, if it is determined that the first PFF component 320 and/or the second PFF component 330 is missing, the controller 370 also indicates to the user that the first PFF component 320 and/or the second PFF component 330 is missing for example by lighting a separate MIL or generating a separate fault code.

If the exhaust system 300 is coupled to a turbine including a variable geometry turbocharger alternatively a turbine outlet pressure measurement could be used, i.e., the exhaust pressure sensor 361 can be positioned downstream of the turbine 360, as described before. In various embodiments, the exhaust pressure sensor 361 can include a physical sensor or a virtual sensor using a turbo speed sensor and physical or virtual turbine flow rate signal to estimate the turbine pressure ratio using a map of the turbine performance. In various embodiments, the virtual sensor can generate a virtual exhaust pressure value determined from at least one of a turbine pressure ratio, a turbine flow estimate, a turbine map and a measured turbine inlet pressure. Using the measured exhaust manifold pressure and the pressure ratio across the turbo, the turbine outlet pressure is then computed and compared against the two threshold curves i.e., the high pressure threshold curve and the low pressure threshold curve as described above.

FIG. 4 depicts an exemplary method of diagnosing operation of a partial filtration filter exhaust aftertreatment system. A partial filtration filter diagnostic system 400 receives an upstream exhaust temperature value at 401 from at least one first sensor positioned upstream of at least one of a DOC component and a first PFF. At 402, the partial filtration filter diagnostic system 400 receives a downstream exhaust temperature value from at least one second sensor positioned downstream of a second PFF positioned downstream of the at least one of the DOC component and the first PFF. At 403, the partial filtration filter diagnostic system 400 determines a frequency difference in a first frequency content of the upstream exhaust temperature value and a second frequency content of the downstream exhaust temperature value.

The method 400 determines if the frequency difference is less than a predetermined threshold at 404. If the frequency difference is greater than the predetermined threshold it is determined that all of the DOC component (e.g., the DOC component 110, 210 or 310), the first PFF component (e.g., the first PFF component 120, 220 or 320) and the second PFF component (e.g., the second PFF component 130, 230 or 330) are present in the exhaust system (e.g., the exhaust system 100, 200 or 300). If the frequency difference is less than the predetermined threshold, it is determined that at least one of the DOC component and the PFF component are not present in the exhaust system at 406. For example, the method 400 determines that at least one of the DOC component 110, the first PFF component 120 and the second PFF component 130 is not present in the exhaust system 100. It is then indicated to a user that at least one of the DOC component and the PFF component is not present in the exhaust system at 408.

Expanding further, if the partial filtration filter diagnostic system 400 determines, based on the difference in the first frequency content and the second frequency content being outside of one or more certain thresholds that a partial filtration filter is missing or malfunctioning, the partial filtration filter diagnostic system 400 may optionally generate an alarm signal or a malfunction signal. The alarm signal or malfunction signal may generate an audible alarm or may cause a communication to be sent, such as an error message being sent to a controller such as an electronic engine control unit for an internal combustion engine connected to the exhaust system being monitored.

Figure 5:
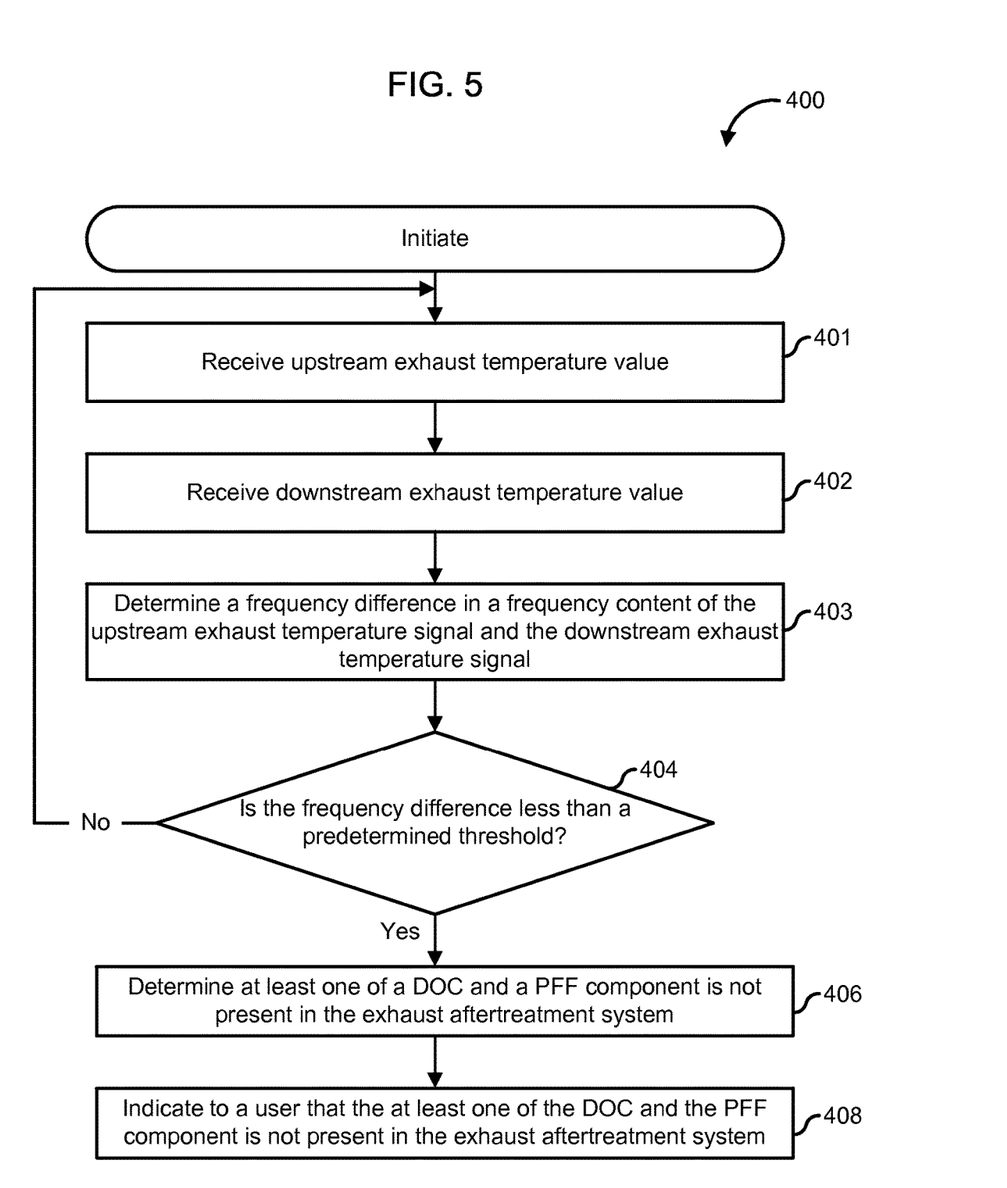
FIG. 5 is flow diagram of an example method of diagnosing operation of a partial filtration filter exhaust aftertreatment system.
Figure 6:
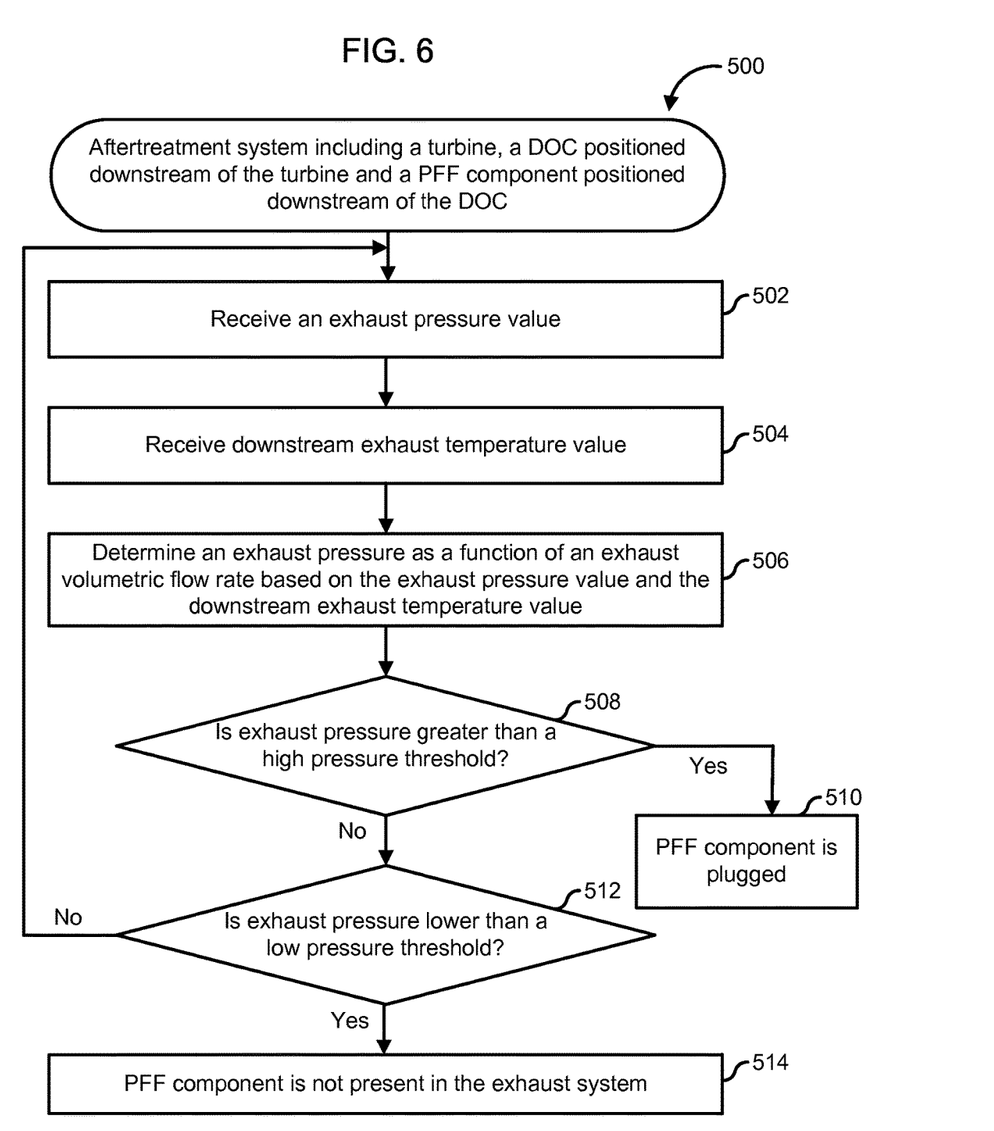
FIG. 6 is flow diagram of another example method for diagnosing operation of a partial filter exhaust aftertreatment system.

FIG. 5 is a schematic flow diagram of another example method 500 for determining a status of a PFF component included in an exhaust system (e.g., the exhaust system 300) that includes a turbine (e.g., the turbine 360), a DOC component (e.g., the DOC component 310) positioned downstream of the turbine 360, and a PFF component (e.g., the first PFF component 320 and the second PFF component 330) positioned downstream of the DOC component. The method 500 includes receiving an exhaust pressure value at 502. For example, the controller 370 receives an exhaust pressure value from a physical or virtual exhaust pressure sensor, as described before. The exhaust pressure value can include an upstream exhaust pressure value or a downstream exhaust pressure value, as described before.

A downstream temperature value is received at 504. For example, the upstream temperature sensor 340 generates a downstream temperature value corresponding to a temperature of the exhaust gas downstream of the turbine 360 and upstream of the DOC component 310. An exhaust pressure is determined as a function of an exhaust volumetric flow rate based on the exhaust pressure value (e.g., an upstream or a downstream exhaust pressure value) and the downstream exhaust temperature value at 506. For example, the controller 370 uses the exhaust volumetric flow rate and the upstream exhaust temperature to determine the exhaust pressure.

It is determined if the exhaust pressure is greater than a high pressure threshold at 508. If the exhaust pressure is greater than the high pressure threshold, then it is determined that the PFF component is plugged at 510. In such embodiments, the method can indicate to a user that the PFF component is plugged, for example by lighting an MIL and/or generating a fault code.

On the contrary, if the exhaust pressure is lower than the high pressure threshold, it is determined if the exhaust pressure is higher than a low pressure threshold at 512. If the exhaust pressure is higher than the low pressure threshold, i.e., between the high pressure threshold and the low pressure threshold, this indicates that the PFF component (e.g., the first PFF component 320 and the second PFF component 330) is working properly, and the method 500 returns to operation 502. However, if the exhaust pressure is below the low pressure threshold, it is determined that the PFF component is not present in the exhaust system at 514. In such embodiments, the PFF component indicates to the user that the PFF component is not present in the exhaust system (e.g., the exhaust system 300), for example by lighting a MIL or generating a fault code.

In certain embodiments, the control system 400 further includes a controller structured to perform certain operations to diagnose operation of a partial filtration filter exhaust aftertreatment system. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes sensor modules configured to determine an upstream and a downstream temperature signal of exhaust flowing through an exhaust system. The upstream and downstream temperature signals are used to determine a frequency difference in a first frequency content of the upstream exhaust temperature signal and a second frequency content of the downstream exhaust temperature signal.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 4.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Other example embodiments are provided for diagnosing PFF detection. One such embodiment is provided in an exhaust system that includes a particulate matter sensor at the outlet of the last PFF. Particulate matter sensors use an open circuit concept, and as particulate accumulates on the circuit it acts to close this circuit and allow current flow. This allows the detection of a rate of particulate accumulation. When this rate accumulates above a certain threshold, then the sensor is heated to oxidize the particulate. Example embodiments may include detecting the rate of soot accumulation or frequency of heating events to determine the rate of tailpipe particulate can Be determined. If the filters are removed, this rate will increase significantly. Accordingly, example embodiments determine the rate of tailpipe particulate and compare it to a threshold to detect the presence of a PFF.

Figure 7:
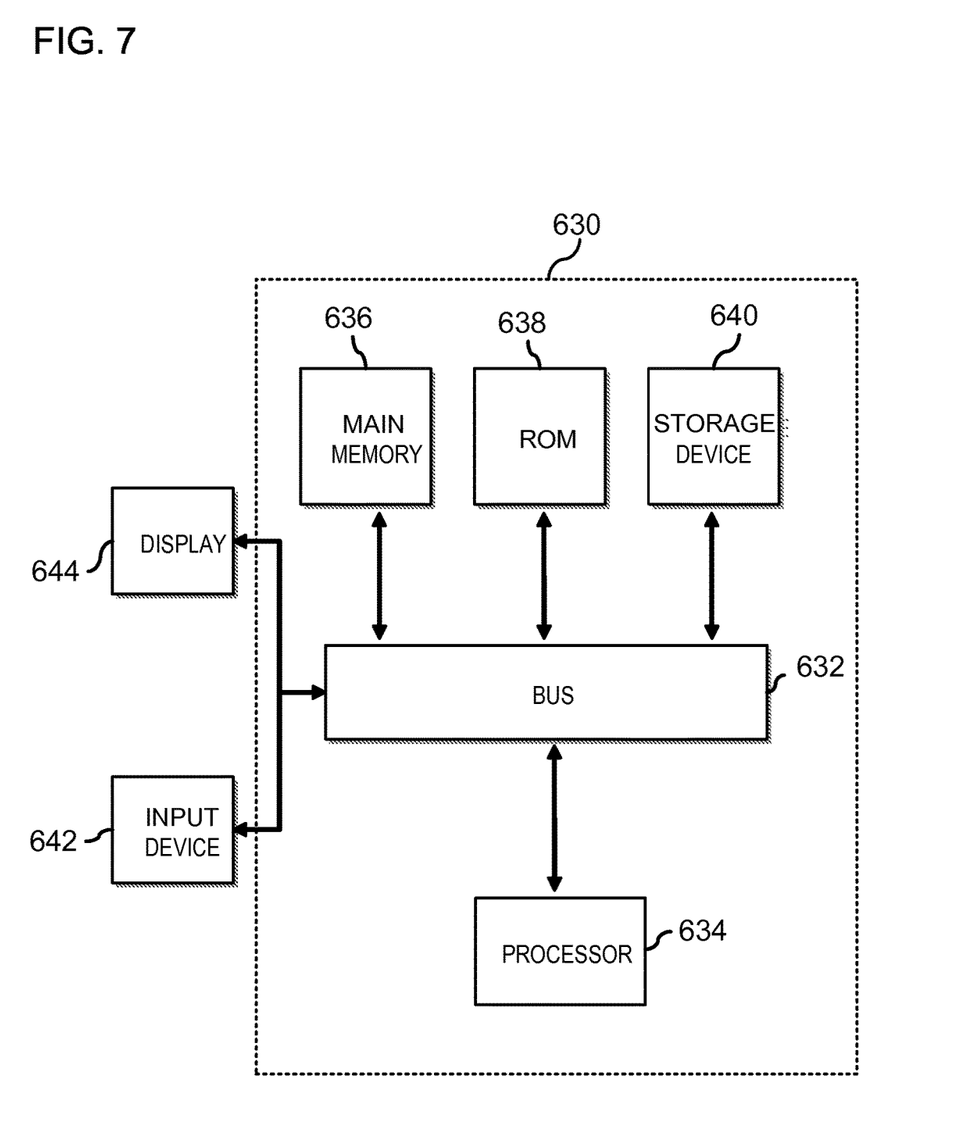
FIG. 7 is a schematic block diagram of a computing device that can be used as the controller of any one FIGS. 1-3.

In some embodiments, the controller 170, 270, 370 or any of the controllers described herein can be a system computer of an apparatus or system which includes the exhaust system 100, 200 or 300 (e.g., a vehicle, an engine or generator set, etc.). For example, FIG. 7 is a block diagram of a computing device 630 in accordance with an illustrative implementation. The computing device 630 can be used to perform any of the methods or the processes described herein, for example the method 400 and/or 500. In some embodiments, the controller 170, 270 or 370 can include the computing device 630. The computing device 630 includes a bus 632 or other communication component for communicating information. The computing device 630 can also include one or more processors 634 or processing circuits coupled to the bus for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include a read only memory (ROM) 638 or other static storage device coupled to the bus 632 for storing static information and instructions for the processor 634. A storage device 640, such as a solid-state device, magnetic disk or optical disk, is coupled to the bus 632 for persistently storing information and instructions. For example instructions for determining the first frequency content, the second frequency content, the frequency difference etc. for determining the status of at least one of the DOC component and the PFF component.

The computing device 630 may be coupled via the bus 632 to a display 635, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 400). Such instructions can be read into main memory 636 from another non-transitory computer-readable medium, such as the storage device 640. Execution of the arrangement of instructions contained in main memory 36 causes the computing device 730 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware circuitry and software.

Although an example computing device has been described in FIG. 7, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

Any sensor described herein may include a virtual sensor that looks up values from a non-transient memory value, receives it from a data link, from an electronic input, and/or from a hardware sensor directly measuring the value or something analogous to the value.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

In the claims, as well as in the specification above, all transitional phrases such as "comprising," "including," "carrying," "having," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A partial filtration filter diagnostic system for an exhaust system, comprising:
   an upstream exhaust temperature module configured to determine an upstream exhaust temperature value in the exhaust system downstream of a location configured to receive a diesel oxidation catalyst (DOC) component, and upstream of a location configured to receive a first partial flow filter (PFF) component, the location configured to receive the first PFF component being downstream of the location configured to receive the DOC component;
   a downstream exhaust temperature module configured to determine a downstream exhaust temperature value in the exhaust system downstream of a location configured to receive a second PFF component, the location configured to receive the second PFF component being downstream of the location configured to receive the first PFF component; and
   a frequency analysis module configured to:
      determine a frequency difference in a first frequency content of the upstream exhaust temperature value and second frequency content of the downstream exhaust temperature value;
      if the frequency difference is less than a predetermined threshold, determine that at least one of the first PFF component and the second PFF component is not present in the exhaust system; and
      if it is determined that at least one of the first PFF component and the second PFF component is not present in the exhaust system, indicate to a user that the at least one of the first PFF component and the second PFF component is not present in the exhaust system.

2. The partial filtration filter diagnostic system of claim 1, wherein the frequency analysis module is configured to determine the frequency difference via a Fast Fourier Transform analysis.

3. The partial filtration filter diagnostic system of claim 1, wherein the frequency analysis module is configured to:
   if the frequency difference is zero, determine that neither the first PFF component nor the second PFF component is present in the exhaust system, and
   if it is determined that neither the first PFF component nor the second PFF component is present in the exhaust system, indicate to the user that the first PFF component and the second PFF component are not present in the exhaust system.

4. A method of diagnosing operation of a partial filtration filter exhaust aftertreatment system, the method comprising:
   receiving an upstream exhaust temperature value corresponding to a fluid temperature downstream of a location configured to receive a diesel oxidation catalyst (DOC) component and upstream of a location configured to receive a first partial flow filter (PFF) component, the first PFF component being downstream of the location configured to receive the DOC component;
   receiving a downstream exhaust temperature value corresponding to fluid temperature downstream of a location configured to receive a second PFF component, the location configured to receive the second PFF component downstream of the location configured to receive the first PFF component;
   determining a frequency difference in a first frequency content of the upstream exhaust temperature value and a second frequency content of the downstream exhaust temperature value;
   if the frequency difference is less than a predetermined threshold, determining that the at least one of the first PFF component and the second PFF component is not present in the exhaust system; and
   if it is determined that at least one of the first PFF component and the second PFF component is not present in the exhaust system, indicating to a user that the at least one of the first PFF component and the second PFF component is not present in the exhaust system.

5. The method of claim 4, wherein determining a frequency difference includes a performing a Fast Fourier Transform of the upstream exhaust temperature value and downstream exhaust temperature value.

6. The method of claim 4, further comprising comparing the difference in the first frequency content of the upstream exhaust temperature value and the second frequency content of the downstream exhaust temperature value in different frequency regimes.

7. The method of claim 4, further comprising receiving the upstream exhaust temperature value from the at least one first sensor positioned downstream of the DOC component.

8. The method of claim 4, wherein the at least one of the first PFF component and the second PFF component include a catalyst coating including at least one of a DOC coating and a selective catalytic reduction catalyst coating.

9. An internal combustion engine system, comprising:
   an internal combustion engine including an exhaust manifold;
   an exhaust aftertreatment system coupled to the exhaust manifold, the exhaust aftertreatment system including:
      a first location configured to receive a diesel oxidation catalyst (DOC) component, a second location configured to receive a first partial flow filter (PFF) component, the second location being downstream of the first location, and a third location configured to receive a second PFF component, the third location being downstream of the second location,
      at least one first sensor positioned downstream of the first location and upstream of the second location, the at least one first sensor configured to detect an upstream exhaust temperature value, and
      at least one second sensor positioned downstream of the third location, the at least one second sensor configured to detect a downstream exhaust temperature value; and a controller communicatively coupled to the at least one first sensor and the at least one second sensor, the controller configured to:
  determine a frequency difference in a first frequency content of the upstream exhaust temperature value and a second frequency content of the downstream exhaust temperature value;
  if the frequency difference is less than a predetermined threshold, determine that at least one of the first PFF component and the second PFF component is not present in the exhaust system; and
  if it is determined that at least one of the first PFF component and the second PFF component is not present in the exhaust system, indicate to a user that the at least one of the first PFF component and the second PFF component is not present in the exhaust system.

10. The internal combustion engine system of claim 9, wherein the controller is configured to determine the frequency difference via a Fast Fourier Transform analysis.

* * * * *